(12) United States Patent
Diamand et al.

(10) Patent No.: US 11,151,074 B2
(45) Date of Patent: Oct. 19, 2021

(54) METHODS AND APPARATUS TO IMPLEMENT MULTIPLE INFERENCE COMPUTE ENGINES

(71) Applicant: Intel Corporation, Santa Clara, CA (US)

(72) Inventors: Israel Diamand, Aderet (IL); Roni Rosner, Binyamina (IL); Ravi Venkatesan, Bangalore (IN); Shlomi Shua, Tel Aviv (IL); Oz Shitrit, Tel Aviv (IL); Henrietta Bezbroz, Or Aqiva (IL); Alexander Gendler, Kirat Motzkin (IL); Ohad Falik, Kfar Saba (IL); Zigi Walter, Haifa (IL); Michael Behar, Zichron Yaakov (IL); Shlomi Alkalay, Pardes-Hanna Karkur (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/542,085

(22) Filed: Aug. 15, 2019

(65) Prior Publication Data

US 2019/0370209 A1     Dec. 5, 2019

(51) Int. Cl.
*G06F 13/42*     (2006.01)
*G06N 3/04*     (2006.01)
*G06F 13/20*     (2006.01)
*G06F 12/0893*     (2016.01)

(52) U.S. Cl.
CPC ...... *G06F 13/4217* (2013.01); *G06F 12/0893* (2013.01); *G06F 13/20* (2013.01); *G06N 3/0454* (2013.01); *G06F 2212/27* (2013.01); *G06F 2213/0038* (2013.01)

(58) Field of Classification Search
CPC .. G06F 12/0893; G06F 13/20; G06F 13/4217; G06F 2212/27; G06F 2213/0038; G06N 3/0454
See application file for complete search history.

(56) References Cited

U.S. PATENT DOCUMENTS

| | | | |
|---|---|---|---|
| 2016/0283438 A1* | 9/2016 | Chen | G06F 13/4068 |
| 2019/0033368 A1* | 1/2019 | Pappu | G01R 31/318513 |
| 2019/0042425 A1* | 2/2019 | Shifer | G06F 12/084 |
| 2019/0102292 A1* | 4/2019 | Agarwal | G06F 12/06 |
| 2019/0325305 A1* | 10/2019 | Zhang | G06N 3/063 |
| 2020/0134445 A1* | 4/2020 | Che | G06N 3/0472 |
| 2020/0184037 A1* | 6/2020 | Zatloukal | G06F 21/105 |

* cited by examiner

*Primary Examiner* — Eric T Oberly
(74) *Attorney, Agent, or Firm* — Hanley, Flight & Zimmerman, LLC (57) ABSTRACT

Methods and apparatus to implement multiple inference compute engines are disclosed herein. A disclosed example apparatus includes a first inference compute engine, a second inference compute engine, and an accelerator on coherent fabric to couple the first inference compute engine and the second inference compute engine to a converged coherency fabric of a system-on-chip, the accelerator on coherent fabric to arbitrate requests from the first inference compute engine and the second inference compute engine to utilize a single in-die interconnect port.

25 Claims, 9 Drawing Sheets

METHODS AND APPARATUS TO IMPLEMENT MULTIPLE INFERENCE COMPUTE ENGINES

FIELD OF THE DISCLOSURE

This disclosure relates generally to compute engines, and, more particularly, to methods and apparatus to implement multiple inference compute engines.

BACKGROUND

In recent years, compute engines or cores of associated microprocessors have been employed to perform numerous parallel calculation operations. In particular, these operations can pertain to machine learning and artificial intelligence (AI) applications, and are typically executed on multiple compute engines (i.e., processing cores) as parallel compute threads.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An Inference Compute Engine (ICE) is a compute engine specialized in Deep Learning Neural Network Inference. Methods and apparatus disclosed herein enable integration of multiple ICE cores to a System-On-Chip. In such examples, the ICE cores share system memory with an application driver that is executed on a system core (e.g., Intel-Architecture Core) and external input/output (IO) devices (e.g., direct memory access (DMA)). In such examples, memory coherency is maintained among all parties. In addition, examples disclosed herein facilitate a software model to see all ICE cores as a single peripheral component interconnect (PCI) device, while maintaining the ability to split the workload among different number of cores (M out of N), give different workloads to different subsets of ICE cores, and have the ability to synchronize among the different ICE cores and among the cores and the driver, in an efficient manner.

In examples disclosed herein, the ICE cores are connected directly to a Converged Coherency Fabric as multiple in-die interconnect (IDI) agents. Since the number of IDI ports is limited, 2 or more ICE cores can share the same IDI ports. A cache coherency is maintained between the ICE cores, system architecture (Intel Architecture) cores and external PCI devices. The ICE cores can use a last-level cache (LLC) to cache data and to share data among themselves or with the system architecture cores. A new primary scalable fabric (PSF) agent, ICE device controller (ICEDC), is introduced, to serve as a single PCI device from a software point of view, while giving SW the ability to control each ICE core independently, and implement synchronization methods between the ICE cores, and between the cores and
SW.

Examples disclosed herein include an accelerator on coherent fabric (ACF) block to adapt ICE cores to the converged coherency fabric (CCF). The ACF translates an advanced extensible interface (AXI) protocol of the ICE cores to an IDI protocol using an AXI2IDI bridge. The example ACF facilitates arbitration among two or more ICE cores to allow multiple cores to share a single IDI port. The example ACF also includes a power management agent (PMA) to manage ICE power states. The example AXI2IDI bridge enables the ICE cores to access memory, memory mapped I/O, etc.

Figure 1:
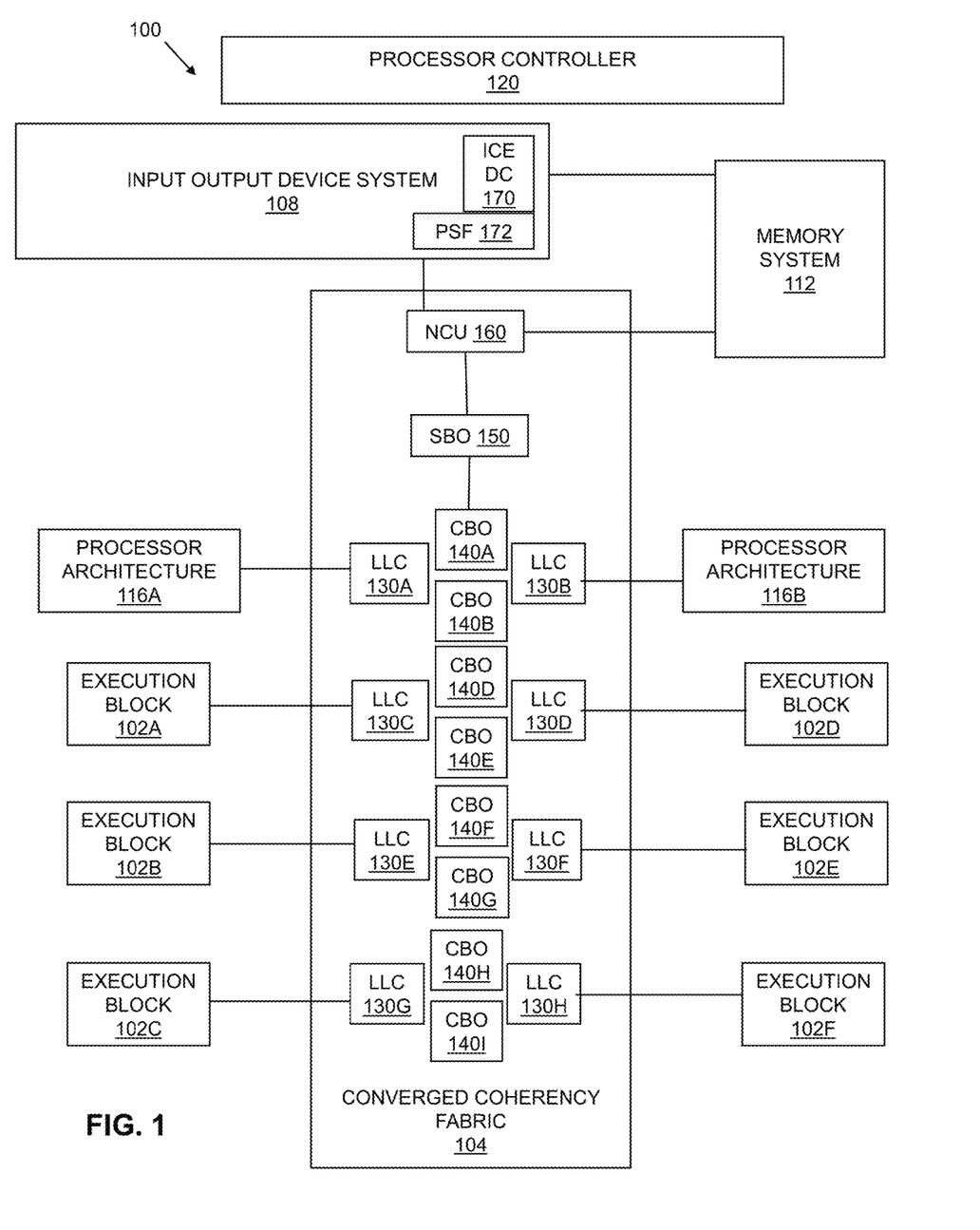
FIG. 1 is a block diagram of an example processor system-on-chip (SoC) that integrates execution blocks that each include multiple ICEs.

FIG. 1 is a block diagram of an example processor system-on-chip (SoC) 100 that integrates execution blocks 102 A-F that each include multiple ICEs (see FIG. 2). The example processor SoC 100 includes a converged coherency fabric 104 that is coupled to the execution blocks 102A-F, to an example input/output device system 108, to an example memory system 112, and to example processor architectures 116A-B.

Figure 2:
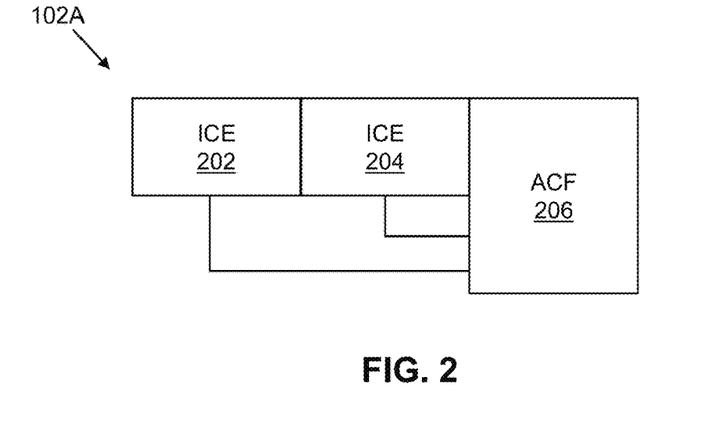
FIG. 2 is a block diagram of an example implementation of the execution blocks of FIG. 1.

The example execution blocks 102A-F each host combinations of multiple specialized compute engine cores and a controller to adapt the compute engine cores to the CCF 104. The example compute engine cores are specialized instruction processors (e.g., instruction processors specially configured for machine learning, specially configured for data mining, etc.). For example, as illustrated in FIG. 2, the example execution block 102A includes a first ICE core 202, a second ICE core 204, and an example Accelerator on Coherent Fabric (ACF) 206. The example ACF 206 adapts the ICE cores 202, 204 to the CCF 104. An example implementation of the ACF 206 is described in conjunction with FIG. 3.

The example execution blocks 102B-F include the same components as the execution block 102A illustrated in FIG. 2. Alternatively, the execution blocks 102A-F may include any number and/or type of ICE cores or other types of processor cores.

The execution blocks 102A-F of the illustrated example communicate with a last level cache (LLC) of the CCF 104 each using a single IDI port. According to the illustrated example, the ACF 206 arbitrates the multiple cores communicating via the single IDI port. Furthermore, the ACF 206 arbitrates different clock rates used by the cores and the CCF. For example, according to the illustrated example, and as described in further detail in conjunction with FIG. 3, the example ACF 206 arbitrates the ICE cores 202, 204 operating at a first clock rate (e.g., clk) and the CCF 104 operating at a second clock rate (e.g., uclk).

The CCF 104 of the illustrated example is a ring network of last level cache (LLC) blocks 130A-H. The LLC blocks 130A-H are connected to the execution blocks 102A-102F and to the processor architectures 116A-B via IDI ports. The example LLC blocks 130A-H and processor architectures 116A-B are communicatively coupled in a ring network via multiple coherency engines (CBO) 140A-140I. The CBO 140A-140I handle access to associated LLC blocks 130A-H and generate transactions back to a core or system interconnect. The CBO 140A-140I also ensure transaction conflicts are properly handled. The example CBO 140A-140I contain the TOR (Table Of Requests) that hold all pending transactions.

In this way the ICE cores of the execution blocks 102A-102F and an ICE driver, which may run as an application on one of the cores of the processor architectures 116A-B, to share the memory in a Unified Memory Architecture. The ICE cores can "see" in the data that was modified by the cores of the processor architectures 116A-B regardless of whether the data is currently cached in core caches, the Last Level Cache 130A-H or already written to memory. ICE cores see the data that was written by each other, and cores of the processor architecture 116A-B see that was written by ICE cores.

The sharing of the LLC 130A-H has another benefit for machine learning and neural network implementations: a large amount of the data, e.g., the neuron network weights and the program, is consumed by more than one of the ICE cores. Once the first ICE core reads the data, the data is read from main memory and cached in LLC 130A-H. All other ICE cores will read the data directly from LLC 130A-H, and hence can access data with higher bandwidth and lower latency than reading from memory.

The example CCF 104 includes an example SBO 150 (e.g., SBOX) to couple the last level cache 130A-H with an example non-cacheable unit (NCU) 160. The SBO 150 organizes traffic between the NCU 160 and the ring network of the LLC 130A-H. The example SBO 150 maintains ordering of traffic to ensure functional correctness in certain cases.

The example NCU 160 couples the example CCF 104 with the example 10 device system 108 and the example memory system 112. The example NCU 160 handles instruction-serializing functions and performs any non-cacheable operations. The example NCU 160 is circuitry to receive load or write requests from the processor architectures 116A-B and/or the execution blocks 102A-F and passes the command to the one of the 10 device system 108 or the memory system 112 to service the request.

The example 10 device system 108 interfaces the example CCF 104 with external devices (e.g., direct memory access).

According to the illustrated example of FIG. 1, the 10 device system 108 includes an example ICE device controller 170 coupled to the CCF 104 via an example primary scalable fabric (PSF) 172. The example ICE device controller 170 is implemented as an integrated on-chip system fabric (IOSF) device and can be accessed by the cores of the processor architectures 116A-B over a primary IOSF fabric, and it can communicate with the ICE cores 202, 204 and ACF blocks 206 of the execution blocks 102A-F through a sideband fabric.

The example ICE DC 170 allows an ICE driver (e.g., executing on a core of the processor architectures 116A-B) to see the distributed ICE cores 202, 204 as a single PCI device. The example ICE DC 170 provides the ICE driver an interface for per-ICE control, to turn on, turn off or reset each ICE core 202, 204 individually. The example ICE DC 170 sends the command to the appropriate ACF 206 associated with an ICE core 202, 204 to be controlled through the sideband Further, the example ICE DC 170 implements one or more memory-mapped IO (MMIO) ranges that allows the ICE driver to access registers of the ICE cores 202, 204, the ACF 206, or the ICE DC 170 itself. Accesses are sent through the primary IOSF fabric to the ICE DC 170, and the ICE DC 170 sends the access to the target ICE core 202, 204 or ACF 206 over the sideband. ICE DC 170 is also responsible for blocking accesses to ICE cores 202, 204 that are currently turned off or under reset. Additionally, the example ICE DC 170 includes sets of counters and semaphores that are accessible by ICE cores 202, 204, and allows them to communicate work progress and synchronize them without involvement of the ICE driver.

The example memory system 112 includes memory that may be accessed via the CCF 104. For example, the memory system 112 includes double-data rate memory random access memory. Alternatively, any other type and/or combination of memory or storage may be included in the memory system 112.

The example processor controller 120 includes multiple components for controlling operation of the processor SoC 100. For example, the processor controller 120 of the illustrated example includes a power management unit for controlling power utilization and operation of the processor SoC 100 and its components.

Figure 3:
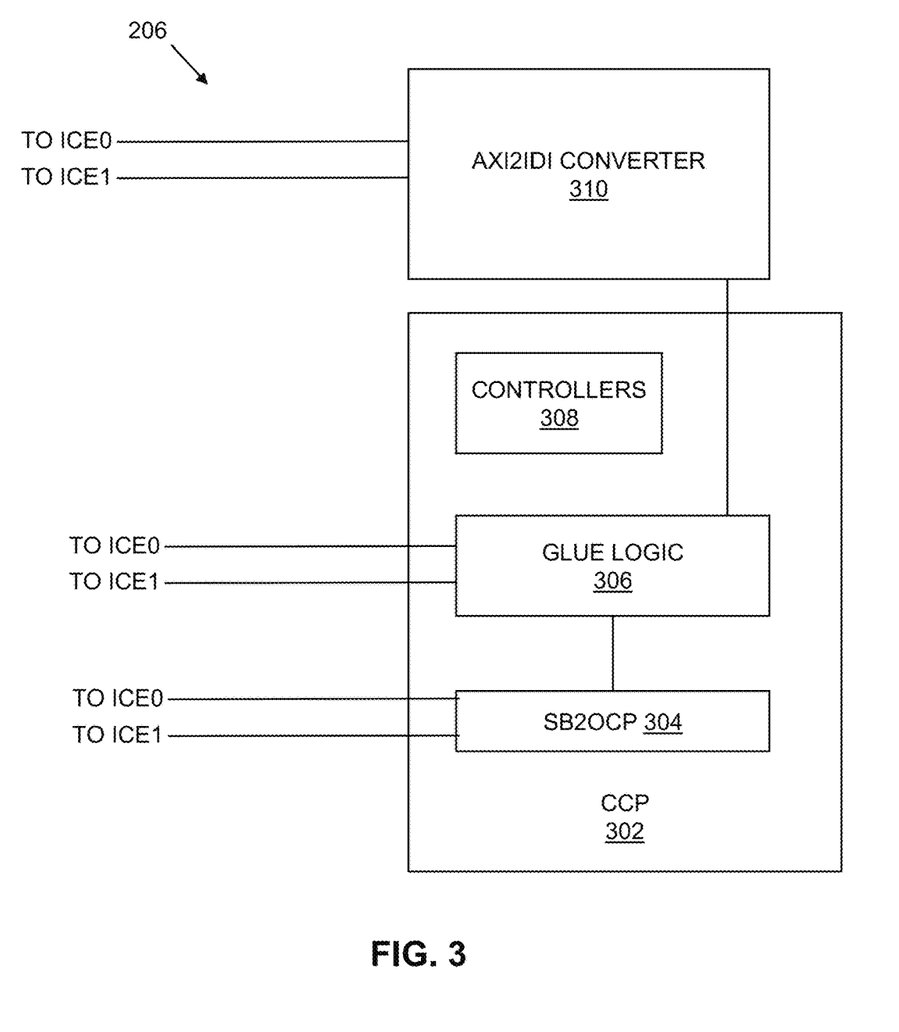
FIG. 3 is a block diagram of an example implementation of the accelerator on coherent fabric of FIG. 2 that is included in the execution block of FIG. 1.

FIG. 3 is a block diagram of an example implementation of the ACF 206 of FIG. 2 that is included in the execution block 102A (and similarly in the execution blocks 102B-F) of FIG. 1. The example ACF 206 adapts the execution blocks 102A-F having multiple ICE cores 202, 204 to communicate on the CCF 104. The example ACF 206 of FIG. 3 includes an example CCP 302 that includes an example sideband-to-OCP interface (SB2OCP) 304, an example glue logic 306, example controllers 308, and an example AXI2IDI converter 310.

The example SB2OCP 304 provides an interface between sideband fabric of the processor SoC 100 and an open core protocol (OCP) of the ICE cores 202, 204. For example, the SB2OCP 304 allows for access from the sideband to internal registers of the ICE cores 202, 204.

The example glue logic 306 interfaces interrupts from the ICE cores 202, 204 to the processor architectures 116A-B. The interrupts may be used to report various events such as work completion and internal errors. The example glue logic 306 translates the interrupts into messages sent over the CCF 104.

The example controllers 308 provide various control blocks for the ACF 206 such as power management controls.

The example AXI2IDI converter 310 manages the interface of the AXI interfaces of the ICE cores 202, 204 with the IDI interface of the CCF 104. In particular, the AXI2IDI converter 310 manages the arbitration of the multiple ICE cores to a single IDI port (e.g., due to a limited number of available IDI ports).

Figure 4:
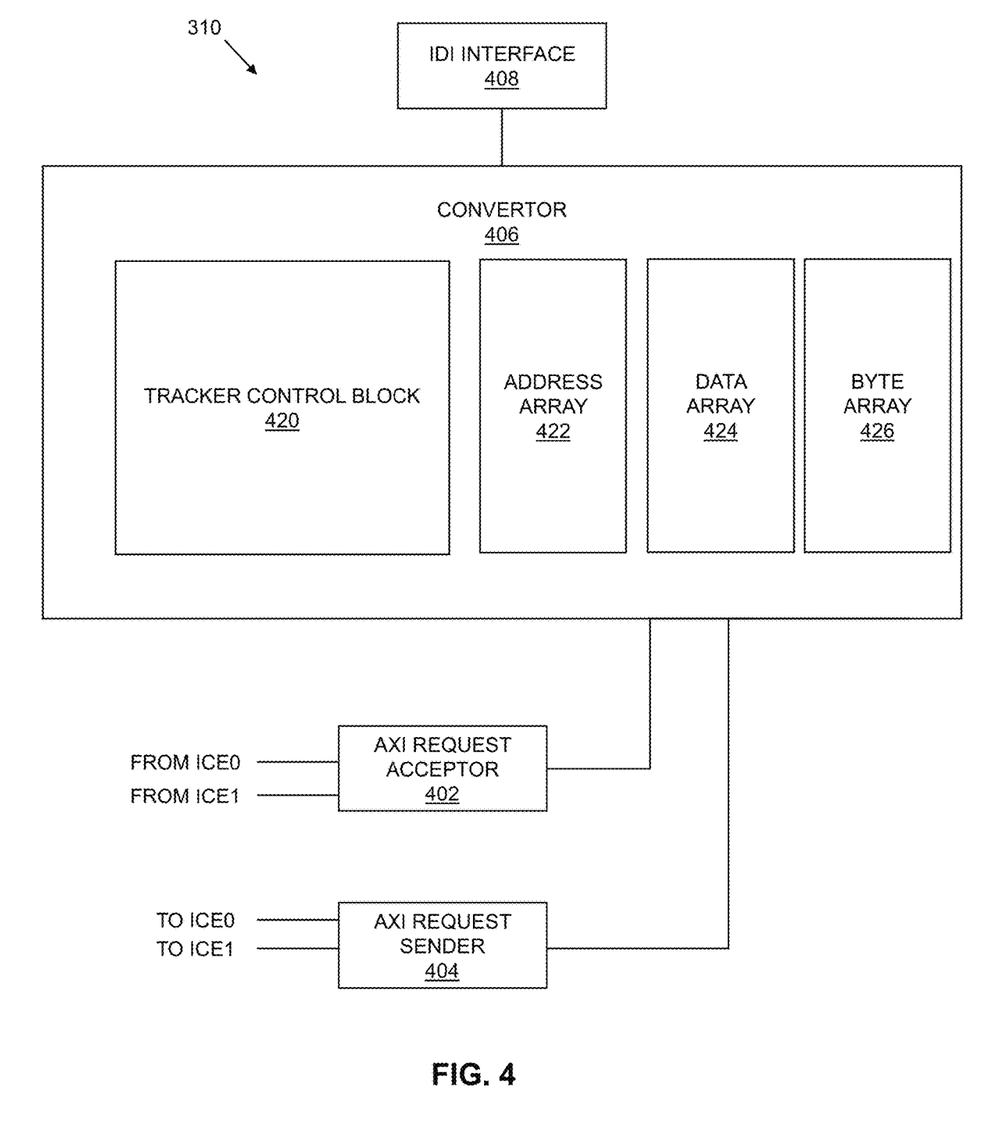
FIG. 4 is a block diagram of an example implementation of the advanced extensible interface to in-die interconnect converter.

FIG. 4 is a block diagram of an example implementation of the AXI2IDI converter 310. The example AXI2IDI converter 310 of FIG. 4 includes an example AXI request acceptor 402, an example AXI request sender 404, an example converter 406, and an example IDI interface 408.

The example AXI request acceptor 402 receives requests/data from the ICE cores 202, 204. An example implementation of the AXI request acceptor 402 is described in conjunction with FIG. 5.

The example AXI request sender 402 sends requests/data to the example ICE cores 202, 204. An example implementation of the AXI request sender 404 is described in conjunction with FIG. 6.

The example convertor 406 of the illustrated example maintains data regarding the multiple requests/data from the ICE cores 202, 204 and the IDI interface 408 to maintain ordering and satisfaction of requests. The example converter 406 includes a tracker control block 420, an example address array 422, an example data array 424, and an example byte array 426.

The example tracker control block 420 stores entries for requests (e.g., write requests and read requests) to be serviced by the ICE cores 202, 204 and/or other devices via the IDI interface 408. For example, the example tracker control block 420 stores AXI attributes, AXI flow control information, IDI attributes, and IDI flow control information for a request.

The example address array 422 stores address information (e.g., an address to be written or an address to be read) for the requests stored in the example tracker control block 420.

The example data array 424 stores data that has been read or is to be written for the requests stored in the example tracker control block 420.

The example byte array 426 stores indicating which bytes are to be written for write requests stored in the example tracker control block 420.

The example tracker control block 420, the example address array 422, the example data array 424, and/or the example byte array 426 may be implemented by any type of memory or storage such as random access memory, cache memory, disk storage memory, flash memory, etc.

The example IDI interface 408 interfaces the AXI2IDI converter 310 to the IDI ports of the example CCF 104. An example implementation of the IDI interface 408 is described in conjunction with FIG. 7.

Figure 5:
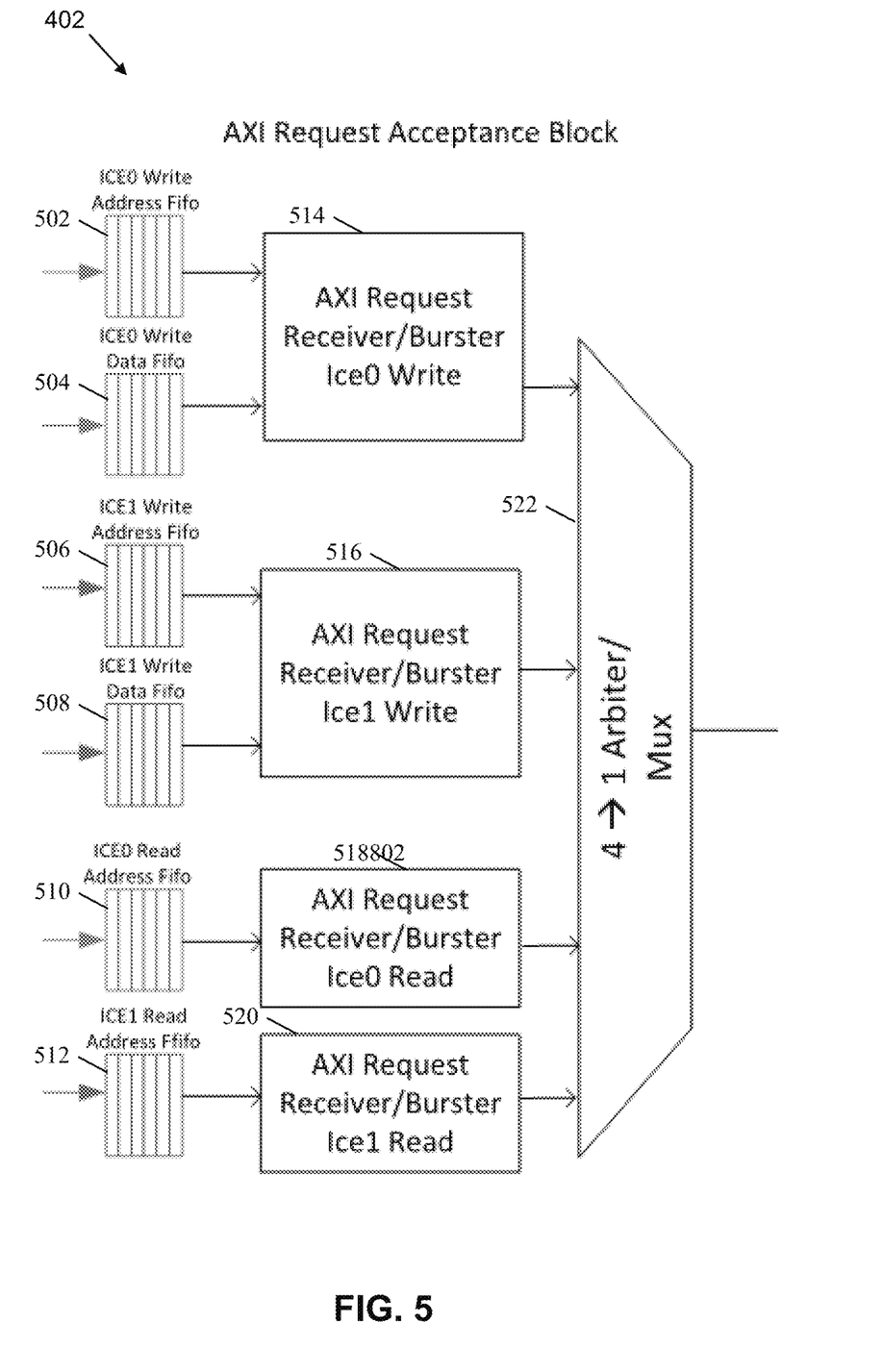
FIG. 5 is a block diagram of an example implementation of the advanced extensible interface request acceptor of FIG. 4.

FIG. 5 is a block diagram of an example implementation of the AXI request acceptor 402 of FIG. 4.

The example AXI request acceptor 402 of FIG. 5 includes an example ICE0 write address first in first out buffer (FIFO) 502, an example ICE0 write data FIFO 504, an example ICE1 write address first in first out buffer (FIFO) 506, an example ICE1 write data FIFO 508, an example ICE0 read address FIFO 510, and an example ICE1 read address FIFO 512. While the example AXI request acceptor 402 interfaces with two ICE cores (e.g., ICE core 202 (e.g., ICE0) and ICE core 204 (e.g., ICE1)), the AXI request acceptor 402 may interface with any number of ICE cores by including write address, write data, and read address FIFOs for each ICE core.

The example AXI request acceptor 402 includes an example AXI request receiver/burster ICE0 write 514 to combine the write address and the write data for transmission. The example AXI request acceptor 402 includes an example AXI request receiver/burster ICE1 write 516 to combine the write address and the write data for transmission. The example AXI request acceptor 402 includes an example AXI request receiver/burster ICE0 read 518 to transmit the read address for ICE0. The example AXI request acceptor 402 includes an example AXI request receiver/burster ICE1 read 520 to combine the transmit the read address to transmit the read address for ICE1.

The example AXI request acceptor 402 includes an example four to one arbiter/multiplexor 522 to arbitrate among the multiple read and write requests and transmit the requests from the multiple ICE cores 202, 204 and transmit the requests to the example converter 406.

Figure 6:
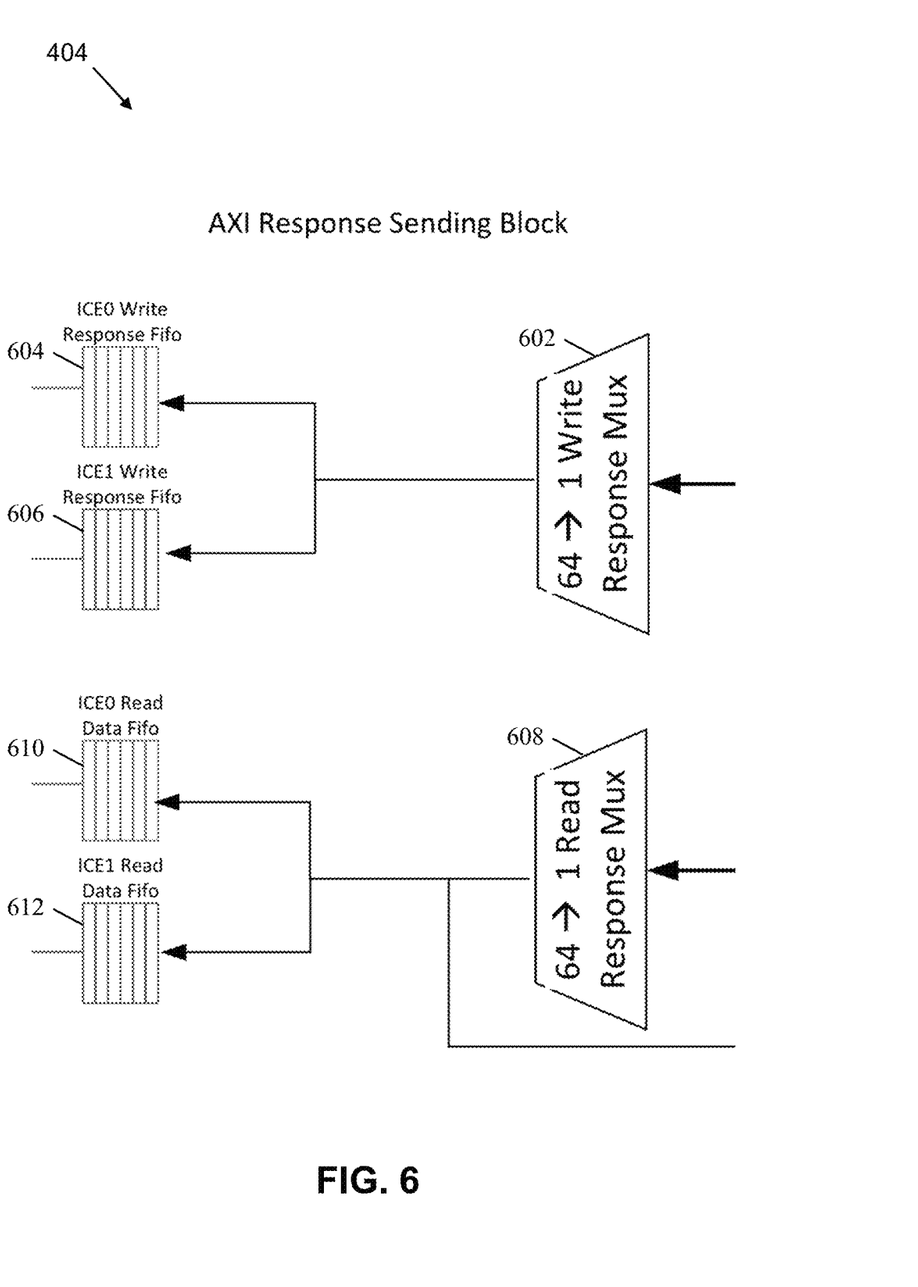
FIG. 6 is a block diagram of an example implementation of the advanced extensible interface request sender of FIG. 4.

FIG. 6 is a block diagram of an example implementation of the AXI request sender 404 of FIG. 4. The example AXI request sender 404 includes an example 64 to 1 write response multiplexor 602 to receive response information from the converter 406. The example AXI request sender 404 includes an example ICE0 write response FIFO 604 and an example ICE1 write response FIFO 606 to store response information for write requests from ICE0 and ICE1, respectively. The example AXI request sender 404 includes an example 64 to 1 read response multiplexor 608 to receive data from the converter 406. The example AXI request sender 404 includes an example ICE0 read data FIFO 610 and an example ICE1 read data FIFO 612 to store response data received for read requests originally sent by ICE0 and ICE1, respectively.

Figure 7:
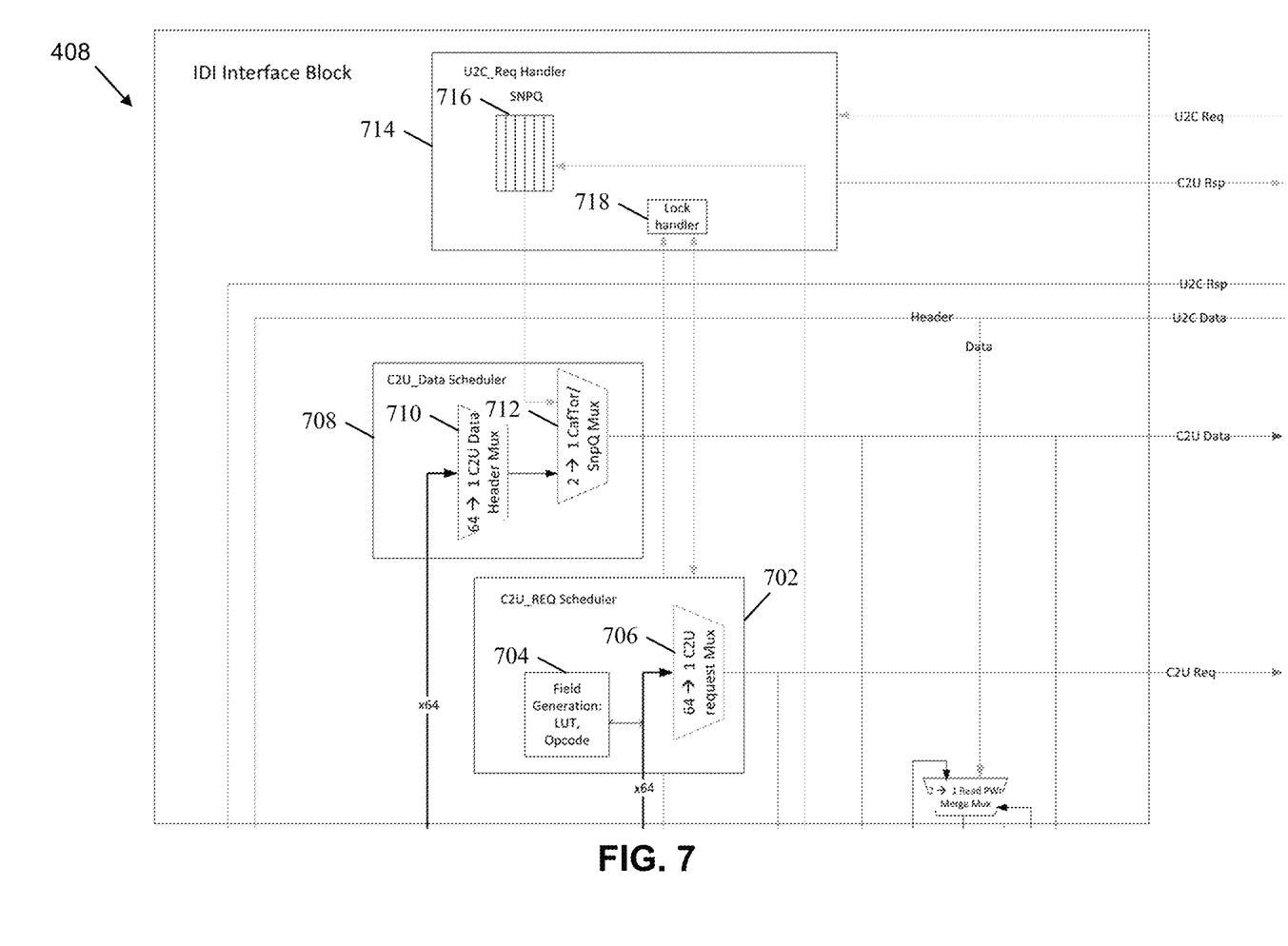
FIG. 7 is a block diagram of an example implementation of the in-die interconnect interface of FIG. 4.

FIG. 7 is a block diagram of an example implementation of the IDI interface 408 of FIG. 4.

The example IDI interface 408 of FIG. 7 includes an example request scheduler 702 that includes an example field generation lookup table 704 and an example 64 to 1 C2U request multiplexor 706. The example request scheduler 702 translates requests from the ICE cores 202, 204 into requests to be sent via the IDI interface.

The example IDI interface 408 of FIG. 7 includes an example data scheduler 708 that includes an example 64 to 1 data header multiplexor 710 that provides its output to a 2 to 1 multiplexor 712 that is coupled with a request handler 714.

The example IDI interface 408 additionally includes the request handler 714. The request handler 714 includes an example request queue 716 and an example lock handler 718. The example request queue 716 stores requests received from the example CCF 104 and queues the requests until they can be processed. The example lock handler 718 controls locks on data during reading or writing of data.

While an example manner of implementing the execution blocks 102A-F of FIG. 1 is illustrated in FIGS. 2-7, one or more of the elements, processes and/or devices illustrated in FIGS. 2-7 may be combined, divided, re-arranged, omitted, eliminated and/or implemented in any other way. Further, the example blocks of FIGS. 1-7 may be implemented by hardware, software, firmware and/or any combination of hardware, software and/or firmware. Thus, for example, any of the example blocks of FIGS. 1-7 and/or, more generally, the example processor SoC 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, blocks of FIGS. 1-7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example processor SoC 100 of FIG. 1 may include one or more elements, processes and/or devices in addition to, or instead of, those illustrated in FIGS. 1-7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the processor architecture 100 are shown in FIGS. 1-7 The machine readable instructions may be one or more executable programs or portion(s) of an executable program for execution by a computer processor such as the ACF 206 shown in the example processor SoC 100. The program may be embodied in software stored on a non-transitory computer readable storage medium such as a CD-ROM, a floppy disk, a hard drive, a DVD, a Blu-ray disk, or a memory associated with the processor SoC 100, but the entire program and/or parts thereof could alternatively be executed by a device other than the processor SoC 100 and/or embodied in firmware or dedicated hardware. Further, although the example program is described with reference to the flowchart illustrated in FIGS. 8-9, many other methods of implementing the example processor SoC 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 8-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
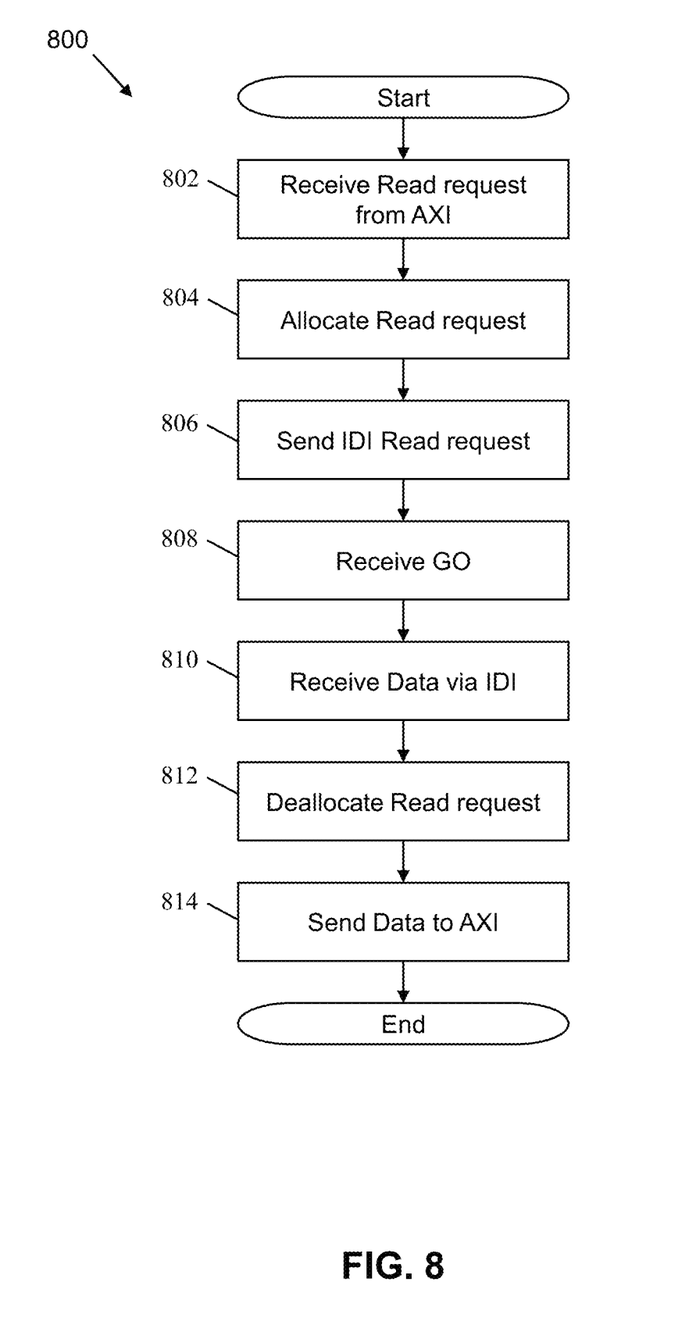
FIGS. 8-9 are flowcharts illustrating example machine readable instructions that may be executed to implement the AXI2IDI converter of FIG. 3.

The program 800 of FIG. 8 is an example process for the example AXI2IDI converter 310 to handle a read request from one of the ICE cores 202, 204 (e.g., ICE core 202). The example request acceptance block 402 receives a read request from the ICE core 202 via AXI (block 802). The example converter 406 allocates the read request within the tracker control block 402 and records the read address in the address array 422 (block 804). The example IDI interface 408 sends the request (e.g., to the LLC or memory) via IDI (block 806). Once a confirmation that the requested data is read is received, the example IDI interface 408 transmits an indication that the data is ready (e.g., a GO notification) to the example converter 406 (block 808). The response data received via the IDI interface 408 is stored by the converter 406 (block 810). The example converter 406 deallocates the read request from the example tracker control block (block 812). The example AXI request sender 404 transmits the data to the requesting ICE core 202 via AXI (block 814).

Figure 9:
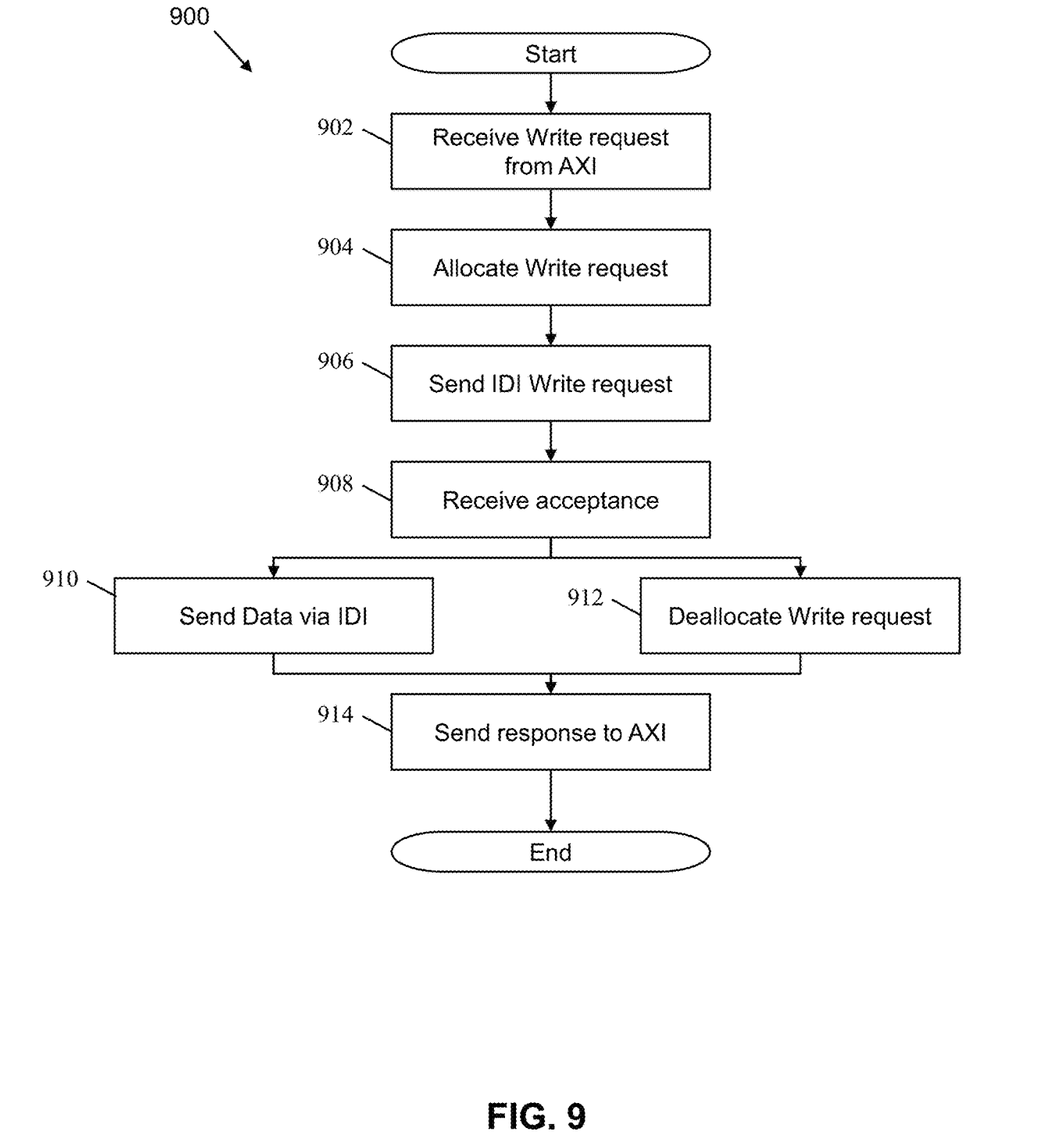

The program 900 of FIG. 9 is an example process for the example AXI2IDI converter 310 to handle a write request from one of the ICE cores 202, 204 (e.g., ICE core 202). The example request acceptance block 402 receives a write request from the ICE core 202 via AXI (block 902). The example converter 406 allocates the write request within the tracker control block 420 and records the write address in the address array 422 and the write data in the example data array 424 (block 904). The example IDI interface 408 sends the request (e.g., to the LLC or memory) via IDI (block 906). Once a confirmation that the destination device is ready to receive data is received, the example IDI interface 408 transmits an acceptance indication (e.g., a GO notification) to the example converter 406 (block 908). The example converter 406 then sends the data to the destination via IDI (block 910). Additionally, the example converter 406 deallocates the write request from the address array 422 (block 912). The example AXI request sender 404 then sends an indication of the status of the write request (e.g., succeeded, failed, etc.) to the ICE core 212 via the AXI interface (block 914).

Figure 10:
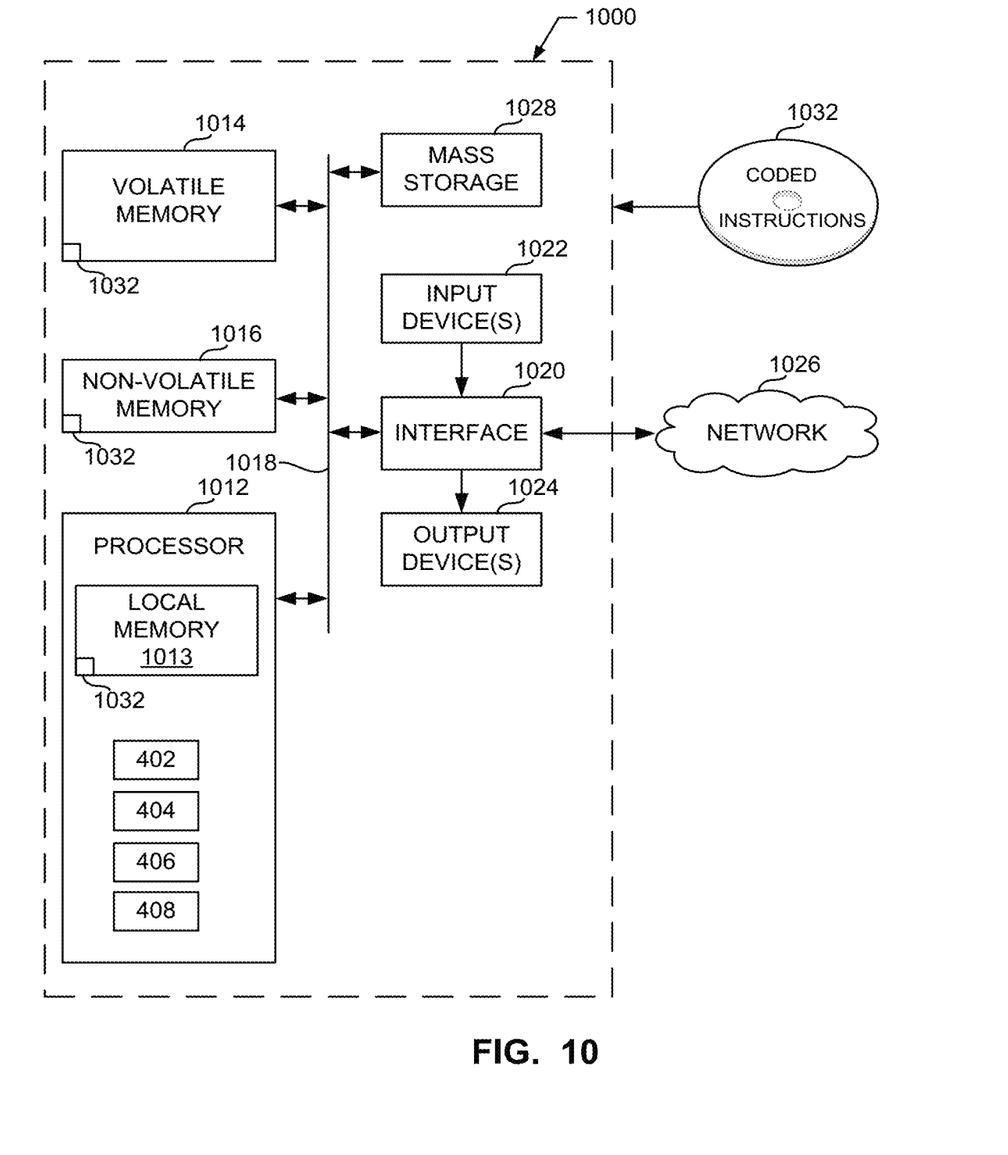
FIG. 10 is a block diagram of an example processing system that may execute the instructions of FIGS. 8-9 to implement the example AXI2IDI converter of FIG. 3.

FIG. 10 is a block diagram of an example processor platform 1000 structured to execute the instructions of FIGS. 8-9 to implement the AXI2IDI converter 310 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example AXI request acceptor 402, the example AXI request sender 404, the example convertor 406, and the example IDI interface 408.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that facilitate that implementation of multiple inference compute engines (or other types of specialized compute engine) in a system on chip. For example, an accelerator on coherent fabric facilitates the connection of multiple inference computer engines with a converged coherency fabric. Such accelerator on coherent fabric enables the multiple compute engines to communicate with a last level cache to enable the sharing of data among the multiple inference compute engines, among the multiple inference compute engines and processor cores, among the multiple inference compute engines and a memory system, etc. The disclosed methods, apparatus and articles of manufacture improve the efficiency of using a computing device by facilitating the sharing of a limited number of in-die interconnect ports while enabling the interconnection and data sharing (e.g., sharing of values from a machine learning model, deep learning system, neural network, etc.) among the multiple inference compute engines. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to implement multiple inference compute engines are disclosed herein. Further examples and combinations thereof include the following:

Example 1 includes an apparatus comprising a first inference compute engine, a second inference compute engine, and an accelerator on coherent fabric to couple the first inference compute engine and the second inference compute engine to a converged coherency fabric of a system-on-chip, the accelerator on coherent fabric to arbitrate requests from the first inference compute engine and the second inference compute engine to utilize a single in-die interconnect port.

Example 2 includes an apparatus as defined in example 1, further including a third inference computer engine and a fourth inference compute engine associated with a second accelerator on coherent fabric.

Example 3 includes an apparatus as defined in example 1, further including the converged coherency fabric, and an input/output device system communicatively coupled to the accelerator on coherent fabric via the converged coherency fabric.

Example 4 includes an apparatus as defined in example 3, further including a memory system coupled to the accelerator on coherent fabric via the converged coherency fabric.

Example 5 includes an apparatus as defined in example 4, further including a processor core coupled to the accelerator on coherent fabric via the converged coherency fabric.

Example 6 includes an apparatus as defined in example 1, wherein the converged coherency fabric includes a last level cache associated with the first inference compute engine and the second inference compute engine via the accelerator on coherent fabric.

Example 7 includes an apparatus as defined in example 6, wherein the last level cache is coupled to a second last level cache via a ring network.

Example 8 includes an apparatus as defined in example 1, wherein the accelerator on coherent fabric receives requests from the first inference compute engine at a first clock rate and sends requests to the converged coherency fabric at a second clock rate.

Example 9 includes an apparatus as defined in example 1, wherein the accelerator on coherent fabric includes a converter to convert communications using an advanced extensible interface protocol to an in-die interconnect protocol.

Example 10 includes an apparatus as defined in example 9, wherein the converter includes an advanced extensible interface request acceptor to receive requests using the advanced extensible interface protocol from the first inference compute engine and the second inference compute engine.

Example 11 includes an apparatus as defined in example 9, wherein the converter includes an advanced extensible interface request sender to send requests using the advanced extensible interface protocol to the first inference compute engine and the second inference compute engine.

Example 12 includes At least one non-transitory computer readable medium comprising instructions that, when executed, cause a machine to at least receive, at an accelerator on coherent fabric, a first request from a first inference compute engine via an advanced extensible interface protocol, receive, at the accelerator on coherent fabric, a second request from a second inference compute engine via the advanced extensible interface protocol, convert, at the accelerator on coherent fabric, the first request to an in-die interconnect interface protocol, and transmit first request in the in-die interconnect interface protocol to a converged coherency fabric.

Example 13 includes At least one non-transitory computer readable medium as defined in example 12, wherein the instructions, when executed, cause the machine to convert, at the accelerator on coherent fabric, the second request to an in-die interconnect interface protocol.

Example 14 includes At least one non-transitory computer readable medium as defined in example 12, wherein the first request is a request to access a device in an input/output device system communicatively coupled to the accelerator on coherent fabric via the converged coherency fabric.

Example 15 includes At least one non-transitory computer readable medium as defined in example 14, wherein the first request is a request to access a memory in a memory system coupled to the accelerator on coherent fabric via the converged coherency fabric.

Example 16 includes At least one non-transitory computer readable medium as defined in example 15, wherein the first request is a request to communicate with a processor core coupled to the accelerator on coherent fabric via the converged coherency fabric.

Example 17 includes At least one non-transitory computer readable medium as defined in example 12, wherein the converged coherency fabric includes a last level cache associated with the first inference compute engine and the second inference compute engine via the accelerator on coherent fabric.

Example 18 includes At least one non-transitory computer readable medium as defined in example 17, wherein the last level cache is coupled to a second last level cache via a ring network.

Example 19 includes At least one non-transitory computer readable medium as defined in example 12, wherein the accelerator on coherent fabric receives requests from the first inference compute engine at a first clock rate and sends requests to the converged coherency fabric at a second clock rate.

Example 20 includes At least one non-transitory computer readable medium as defined in example 12, wherein the accelerator on coherent fabric includes a converter to convert communications using the advanced extensible interface protocol to an in-die interconnect protocol.

Example 21 includes At least one non-transitory computer readable medium as defined in example 20, wherein the converter includes an advanced extensible interface request acceptor to receive requests using the advanced extensible interface protocol from the first inference compute engine and the second inference compute engine.

Example 22 includes At least one non-transitory computer readable medium as defined in example 20, wherein the converter includes an advanced extensible interface request sender to send requests using the advanced extensible interface protocol to the first inference compute engine and the second inference compute engine.

Example 23 includes a method comprising receiving, at an accelerator on coherent fabric, a first request from a first inference compute engine via an advanced extensible interface protocol, receiving, at the accelerator on coherent fabric, a second request from a second inference compute engine via the advanced extensible interface protocol, converting, at the accelerator on coherent fabric, the first request to an in-die interconnect interface protocol, and transmitting first request in the in-die interconnect interface protocol to a converged coherency fabric.

Example 24 includes a method as defined in example 23, further including converting, at the accelerator on coherent fabric, the second request to an in-die interconnect interface protocol.

Example 25 includes a method as defined in example 23, wherein the first request is a request to access a device in an input/output device system communicatively coupled to the accelerator on coherent fabric via the converged coherency fabric.

Example 26 includes a method as defined in example 25, wherein the first request is a request to access a memory in a memory system coupled to the accelerator on coherent fabric via the converged coherency fabric.

Example 27 includes a method as defined in example 26, wherein the first request is a request to communicate with a processor core coupled to the accelerator on coherent fabric via the converged coherency fabric.

Example 28 includes a method as defined in example 23, wherein the converged coherency fabric includes a last level cache associated with the first inference compute engine and the second inference compute engine via the accelerator on coherent fabric.

Example 29 includes a method as defined in example 28, wherein the last level cache is coupled to a second last level cache via a ring network.

Example 30 includes a method as defined in example 23, wherein the accelerator on coherent fabric receives requests from the first inference compute engine at a first clock rate and sends requests to the converged coherency fabric at a second clock rate.

Example 31 includes a method as defined in example 23, wherein the accelerator on coherent fabric includes a converter to convert communications using the advanced extensible interface protocol to an in-die interconnect protocol.

Example 32 includes a method as defined in example 31, wherein the converter includes an advanced extensible interface request acceptor to receive requests using the advanced extensible interface protocol from the first inference compute engine and the second inference compute engine.

Example 33 includes a method as defined in example 31, wherein the converter includes an advanced extensible interface request sender to send requests using the advanced extensible interface protocol to the first inference compute engine and the second inference compute engine.

The following claims are hereby incorporated into this Detailed Description by this reference, with each claim standing on its own as a separate embodiment of the present disclosure.

What is claimed is:

1. An apparatus comprising:
   a first inference compute engine;
   a second inference compute engine;
   a converged coherency fabric of a system-on-chip; and
   an accelerator on coherent fabric (ACF) of the system-on-chip, the ACF to couple the first inference compute engine and the second inference compute engine to the converged coherency fabric using a single in-die interconnect port, the ACF to arbitrate requests from the first inference compute engine and the second inference compute engine to utilize the single in-die interconnect port, the ACF having a first end and a second end, the first end coupled to the first inference compute engine, the second end coupled to the converged coherency fabric.

2. An apparatus as defined in claim 1, further including:
   a third inference compute engine;
   a fourth inference compute engine; and
   a second ACF to couple the third inference compute engine and the fourth inference compute engine to the converged coherency fabric using a different single in-die interconnect port.

3. An apparatus as defined in claim 1, further including:
   an input/output device system communicatively coupled to the ACF via the converged coherency fabric.

4. An apparatus as defined in claim 3, further including a memory system coupled to the ACF via the converged coherency fabric.

5. An apparatus as defined in claim 4, further including a processor core coupled to the ACF via the converged coherency fabric.

6. An apparatus as defined in claim 1, wherein the converged coherency fabric includes a last level cache associated with the first inference compute engine and the second inference compute engine via the ACF.

7. An apparatus as defined in claim 6, wherein the last level cache is coupled to a second last level cache via a ring network.

8. An apparatus as defined in claim 1, wherein the ACF receives requests from the first inference compute engine at a first clock rate and sends requests to the converged coherency fabric at a second clock rate.

9. An apparatus as defined in claim 1, wherein the ACF includes a converter to convert communications using an advanced extensible interface protocol to an in-die interconnect protocol.

10. An apparatus as defined in claim 9, wherein the converter includes an advanced extensible interface request acceptor to receive requests using the advanced extensible interface protocol from the first inference compute engine and the second inference compute engine.

11. An apparatus as defined in claim 9, wherein the converter includes an advanced extensible interface request sender to send requests using the advanced extensible interface protocol to the first inference compute engine and the second inference compute engine.

12. At least one non-transitory computer readable medium comprising instructions that, when executed, cause a machine to at least:
receive, at an accelerator on coherent fabric (ACF), a first request from a first inference compute engine via an advanced extensible interface protocol;
receive, at the ACF, a second request from a second inference compute engine via the advanced extensible interface protocol;
convert, at the ACF, the first request to an in-die interconnect interface protocol; and
transmit the first request in the in-die interconnect interface protocol to a converged coherency fabric, wherein the ACF couples the first inference compute engine and the second inference compute engine to the converged coherency fabric using a single in-die interconnect port, the ACF having a first end and a second end, the first end coupled to the first inference compute engine, the second end coupled to the converged coherency fabric.

13. At least one non-transitory computer readable medium as defined in claim 12, wherein the instructions, when executed, cause the machine to convert, at the ACF, the second request to the in-die interconnect interface protocol.

14. At least one non-transitory computer readable medium as defined in claim 12, wherein the first request is a request to access a device in an input/output device system communicatively coupled to the ACF via the converged coherency fabric.

15. At least one non-transitory computer readable medium as defined in claim 12, wherein the first request is a request to access a memory in a memory system coupled to the ACF via the converged coherency fabric.

16. At least one non-transitory computer readable medium as defined in claim 12, wherein the first request is a request to communicate with a processor core coupled to the ACF via the converged coherency fabric.

17. At least one non-transitory computer readable medium as defined in claim 12, wherein the converged coherency fabric includes a last level cache associated with the first inference compute engine and the second inference compute engine via the ACF.

18. At least one non-transitory computer readable medium as defined in claim 17, wherein the last level cache is coupled to a second last level cache via a ring network.

19. At least one non-transitory computer readable medium as defined in claim 12, wherein the ACF receives requests from the first inference compute engine at a first clock rate and sends requests to the converged coherency fabric at a second clock rate.

20. At least one non-transitory computer readable medium as defined in claim 12, wherein the ACF includes a converter to convert communications using the advanced extensible interface protocol to an in-die interconnect protocol.

21. At least one non-transitory computer readable medium as defined in claim 20, wherein the converter includes an advanced extensible interface request acceptor to receive requests using the advanced extensible interface protocol from the first inference compute engine and the second inference compute engine.

22. At least one non-transitory computer readable medium as defined in claim 20, wherein the converter includes an advanced extensible interface request sender to send requests using the advanced extensible interface protocol to the first inference compute engine and the second inference compute engine.

23. A method comprising:
receiving, at an accelerator on coherent fabric (ACF), a first request from a first inference compute engine via an advanced extensible interface protocol;
receiving, at the ACF, a second request from a second inference compute engine via the advanced extensible interface protocol;
converting, at the ACF, the first request to an in-die interconnect interface protocol; and
transmitting first request in the in-die interconnect interface protocol to a converged coherency fabric, wherein the ACF couples the first inference compute engine and the second inference compute engine to the converged coherency fabric using a single in-die interconnect port, the ACF having a first end and a second end, the first end coupled to the first inference compute engine, the second end coupled to the converged coherency fabric.

24. A method as defined in claim 23, further including converting, at the ACF, the second request to an in-die interconnect interface protocol.

25. A method as defined in claim 23, wherein the first request is a request to access a device in an input/output device system communicatively coupled to the ACF via the converged coherency fabric.

* * * * *